UNITED STATES PATENT OFFICE.

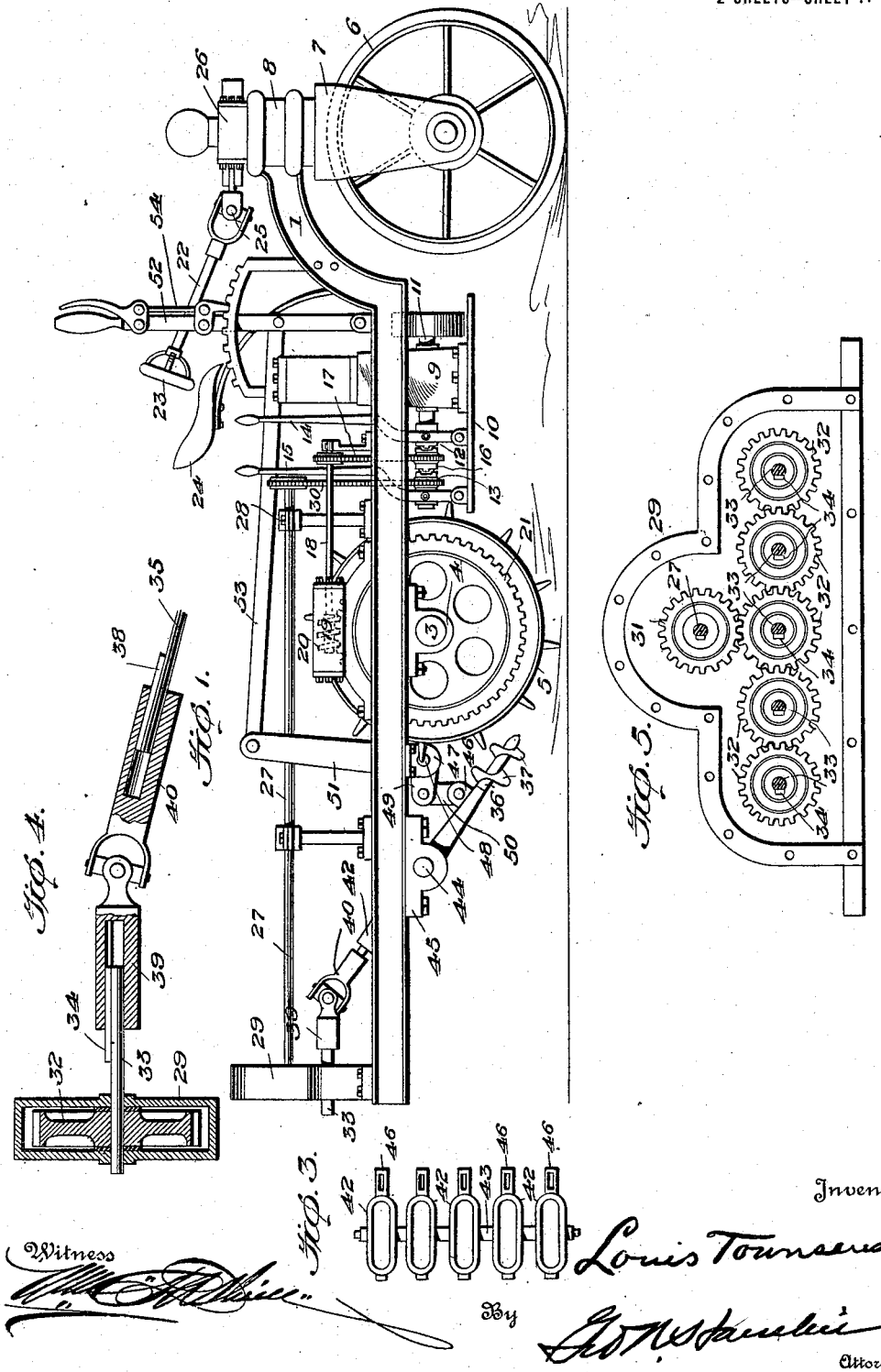

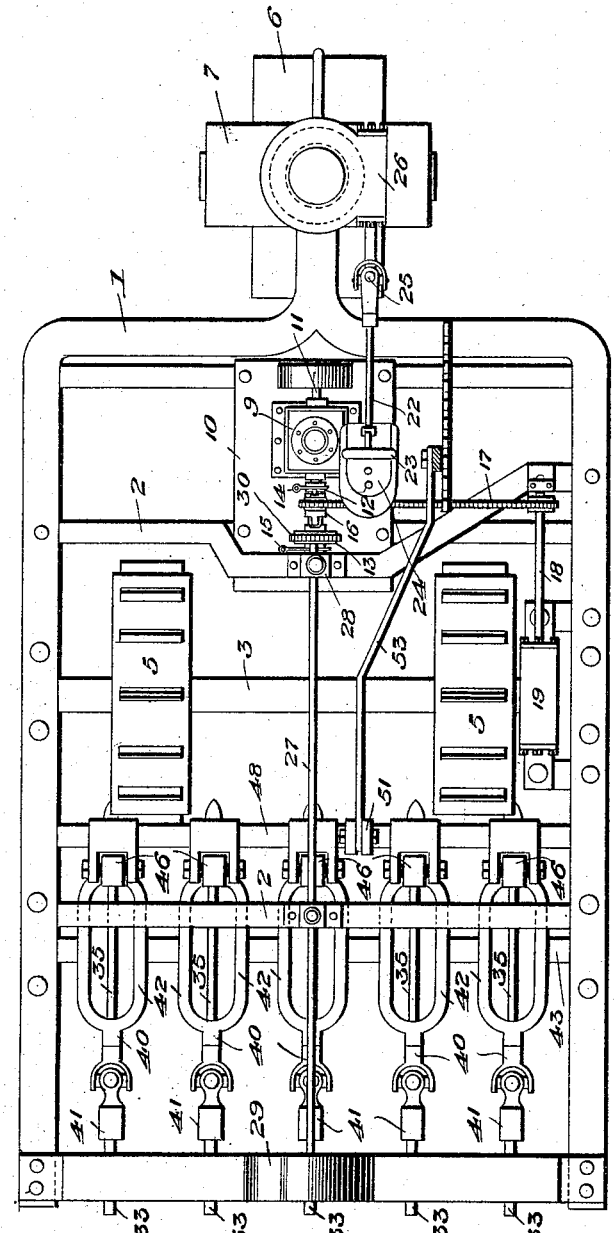

LOUIS TOWNSEND, OF EVANSVILLE, INDIANA.

TRACTOR-PLOW.

1,184,276.  Specification of Letters Patent.  Patented May 23, 1916.

Application filed January 5, 1916. Serial No. 70,388.

*To all whom it may concern:*

Be it known that I, LOUIS TOWNSEND, a citizen of the United States, residing at Evansville, county of Vanderburg, and State of Indiana, have invented certain new and useful Improvements in Tractor-Plows, of which the following is a specification.

This invention relates to tractor plows.

My object is to provide a tractor plow of generally improved construction provided with novel rotary plows which are mounted, adjusted and driven in an improved manner.

The invention is susceptible of various modifications within the spirit and scope thereof and the embodiment of the invention hereinafter set forth and which is shown in the accompanying drawings is to be deemed as illustrative, rather than restrictive, of the scope of the invention.

In the accompanying drawings:—Figure 1 is a side elevation; Fig. 2, a plan view; Fig. 3, a plan view of the gang of plow beams or carriers; Fig. 4, a detail of the driving means and universal joint for each rotary plow; and Fig. 5, a detail of the gearing for the gang of plows.

The frame 1 is of general rectangular form and provided with the cross braces 2.
The main axle 3 which is journaled in suitable bearings 4, carries the traction wheel 5. The steering wheel 6 is carried by a frame 7 which is swiveled at 8 in the forwardly projecting part of frame 1.
The wheels 5 are preferably provided with cross ribs and the wheel 6 with a peripheral flange, facilitating a proper gripping action on the ground when advancing and turning.
The internal combustion engine 9 which is suitably carried by a platform 10 suspended from frame 1, has a shaft 11 on which are clutches 12 and 13 controlled by levers 14 and 15. Another clutch section 16 on shaft 11 is connected by sprocket wheels and a chain 17 to a suitably journaled shaft 18 which carries within the boxing 19 a worm gear shown by dotted lines 20, which meshes with a large worm wheel 21 carried by one of the wheels 5. On shifting the lever 14 to engage the clutches 12 and 16, the engine 9 is made to drive the wheels 5 and axle 3 to advance the machine, which may then be steered by suitable steering means comprising shaft 22 having hand-wheel 23 conveniently located to the driver's seat 24, a universal joint 25 and worm and pinion mechanism, not shown, contained within the boxing 26 and coöperating with the pintle of the frame 7.

The rotary plows are driven by a shaft 27 mounted in a bearing 28 and in the gear case 29 at the rear of the machine. Sprocket wheels on the clutch 13 and shaft 27 are connected by a sprocket chain 30 so that upon shifting the lever 15 to engage clutches 13 and 16, the plows may be driven from the shaft 11 while the machine is advancing.

The shaft 27 carries gear 31, Fig. 5, which drives the gears 32 fast on the shafts 33, each shaft 33 having a fixed feather or spline 34. The shafts or stems 35 for the respective rotary plows 36, which latter have spiral blades 37, are provided with fixed keys or splines 38. The universal joints for connecting the respective shafts 33 to the plow stems or shafts 35, as shown in Fig. 4, comprise sleeves 39 and 40 having key seats or ways receiving the splines 34 and 38 so that the complete universal joint may slip in relation to shafts 33 and 35 and the plows 36 will be driven in whatever angle to the horizontal they may be inclined.

The stems 35 and plows 36 are carried by open or loop-shaped beams or carriers 42 which, as shown in Figs. 2 and 3, are permanently connected, or cast, together to constitute the complete gang having a connecting shaft 43 whose ends 44 are journaled in bearings 45, Fig. 1. At their forward ends, the carriers or beams 42 are provided with lugs 46. Journaled in bearings 47, Fig. 1, on the opposite side pieces of the frame 1, is a cross shaft 48 which has arms 49 corresponding in number to the plow carriers 42 and, respectively, pivotally connected by links 50 to the lugs or ears 46. Upon rocking the shaft 48, the articulated connection thus provided between the respective shafts and carriers 42 causes all of the carriers to simultaneously rock and they may be thus disposed at any desired angle to the horizontal to correspondingly arrange the plows 36 in any desired angular position according to the character of the work. To permit the driving of the plows when in any one of the various angular positions they may assume, the universal joint and spline connection of Fig. 4 is provided.

A convenient means for rocking the shaft 48 consists of a lever 51 secured to shaft 48 to which lever a hand lever 52 is connected by a link 53, the hand lever being locked by suitable latch mechanism 54 to a latching segment 55 on frame 1, the lever 52 being arranged convenient to the seat 24.

It is within the scope of my invention to change the form of the plows 36 and the precise manner in which they are mounted, and to vary the number of these plows. Furthermore, the manner in which the machine is driven forwardly and the drive controlling means for the plows may be varied and other changes and modifications resorted to without departing from the spirit and scope of the invention as expressed in the claims.

Having thus described my invention, what I claim as new and desire to secure by Letters Patent, is:—

1. In a tractor plow, the combination with a frame, of a carrier rockably mounted intermediate its ends on said frame, a rotary earth-treating device carried by said carrier, a rotary driving device on the frame, and a combined slip joint and universal joint connection between the driving device and the upper end of the rotary earth-treating device, whereby the latter may be driven when in any position.

2. In a tractor plow, the combination with a frame, of a carrier rockably mounted intermediate its ends on said frame, a rotary earth-treating device carried by said carrier, a rotary driving device on the frame, a combined slip joint and universal joint connection between the driving device and the upper end of the rotary earth-treating device, whereby the latter may be driven when in any position, and means on the frame coöperating with said carrier adapted to dispose the earth-treating device in any desired position and to hold it where positioned.

3. In a tractor plow, the combination with a frame, of a plurality of connected carriers rockably mounted intermediate their ends on the frame to move in unison up or down, independent rotary earth-treating devices carried by the respective carriers, a system of intermeshing gears having shafts, combination slip and universal joint connections between the respective shafts and respective rotary earth-treating devices, whereby the latter may be driven whatever their angular disposition, a motor on the frame for driving said gears, a rock shaft on the frame having a connection with the carriers, and lever-operated means for turning the rock shaft, whereby the gang of carriers may be raised or lowered while being driven.

In testimony whereof, I hereunto affix my signature.

LOUIS TOWNSEND.

Copies of this patent may be obtained for five cents each, by addressing the "Commissioner of Patents, Washington, D. C."